July 3, 1928.
R. McCORMICK
SURVEYOR'S DEVICE
Filed Sept. 13, 1926
1,675,946
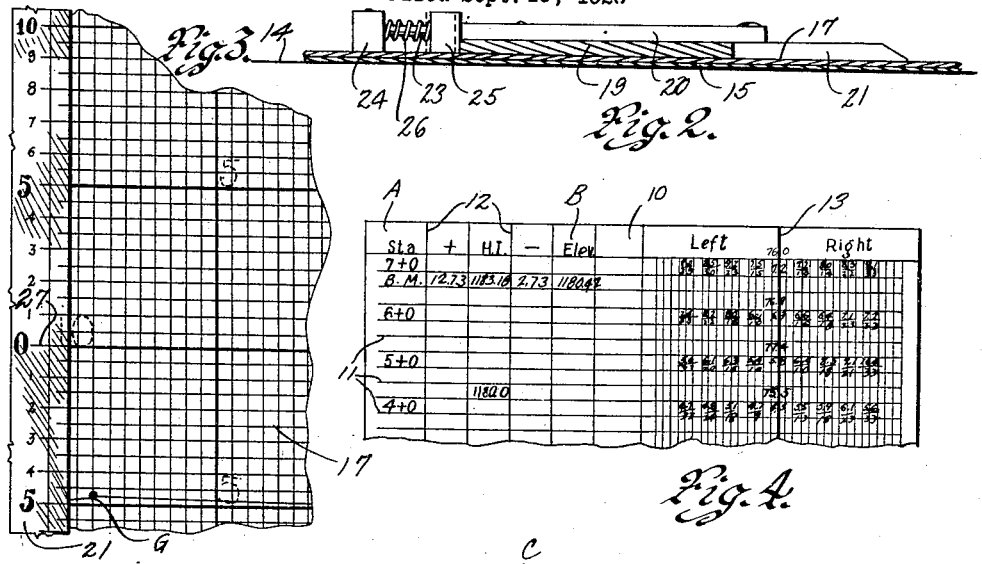
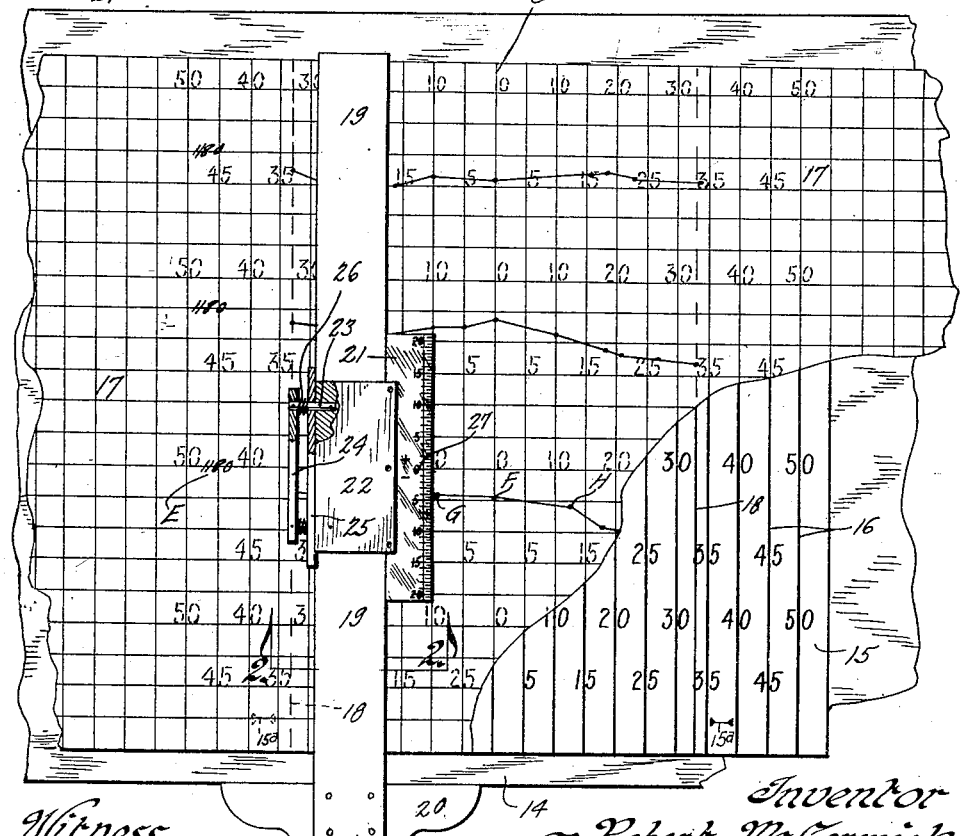

Patented July 3, 1928.

1,675,946

UNITED STATES PATENT OFFICE.

ROBERT McCORMICK, OF AMES, IOWA.

SURVEYOR'S DEVICE.

Application filed September 13, 1926. Serial No. 135,099.

The purpose of my invention is to provide a surveying device of very simple and inexpensive construction which may be used in plotting the results of surveying work with better ease, accuracy, and speed than would be otherwise possible.

More particularly it is my purpose to provide such a device comprising a T square with a graduated ruler mounted on the body thereof for longitudinal adjustment and for quick detachability in such manner that the under surface of the T square shank and of the ruler and attaching means may lie flat on the surface of a drawing board or a sheet of drawing paper.

With these and other objects in view, my invention consists in the construction, arrangement and combination of the various parts of my device, whereby the objects contemplated are attained, as hereinafter more fully set forth pointed out in my claims, and illustrated in the accompanying drawings, in which:

Figure 1 shows a top or plan view of a surveyor's device embodying my invention, shown in juxtaposition to a drawing board with drawing paper thereon, parts being broken away and parts being shown in section.

Figure 2 is a detail sectional view of the device taken on the line 2—2 of Figure 1.

Figure 3 is an enlarged plan view of the portion of the ruler superposed on a sheet of paper used in making elevational cross sections; and Figure 4 is a plan view of a sheet of surveyor's records.

For convenience of illustration, I shall describe my surveyor's device and illustrate its use in connection with the preparing of sheets of cross sections of the kind used in highway construction.

It is the custom for the surveyor to follow the route of the highway and at regular and necessary intervals to take readings across the the highway to illustrate the contour of the ground over which the highway is to be built.

In Figure 4 I have shown a sheet illustrating the manner in which the readings are recorded. Figure 4 shows a sheet indicated generally by the reference character 10 having a series of regularly spaced horizontal lines 11. The sheet is divided into columns or spaces by means of a series of vertical lines 12. A part of these columns are relatively wide and part of the columns relatively narrow. On the right hand part of the sheet is a heavy vertical line 13 and on opposite sides thereof there are the words "Left" and "Right" or equivalent indicia.

The first column A is used for indicating the stations from which the readings are made. Another column, as B, is used for indicating elevation at referenced elevation monuments or bench marks as they are sometimes called.

Assuming that the line 13 represents a dividing line for the center of the proposed highway, the surveyor puts in the spaces horizontally opposite the one representing the station and adjacent the line 13, the rod reading at the center of the road at that station, as for example, in the upper horizontal line, 7.2. He may by calculation, determine the elevation and above the 7.2, place the elevation as for instance, 76, the 11 being omitted. The 76 represents the 1176 which is the elevation relative to the instrument height. He then takes a reading at a certain distance, to the left of the center of the road for example, 15 feet, which may be the next high or low point away from the center. In the horizontal column, the surveyor places the rod reading as for example, 7.5 and under that, the distance from the center of the road as for instance 15 feet. He then takes the reading at a point say 23 feet from the center of the road and puts down the rod reading, 9.2, over the distance from the center of the road, 23 feet. He then takes the reading 30 feet from the center of the road to the left and takes down the reading, 8.5 and under that, 30, representing thirty feet from the center of the road.

He then takes readings on the right of the center as shown in Figure 4. In the upper horizontal column, first reading to the right of the center shows 7.2 over the numeral 10. The numeral 10 represents the number of feet to the right from the center of the road. Lower down on the sheet in another column A is the indicia for the next station at which readings are taken. In the corresponding horizontal column are readings similar to those above mentioned.

After the surveying has been done there then remains the task of plotting the elevational cross sections of the road at the different stations. One method has been to reduce each rod reading to the actual elevation relative to the transit elevation or height of instrument and then plotting the cross sections from these reductions and it is obvious that this is a slow and tedious process requiring care and great accuracy. Where my device is used, the surveyor can plot a cross section by merely reproducing the readings in the following manner.

He places on a drawing board 14 a sheet of heavy ruled paper 15 having the vertical rulings 16. Indicating marks 15$^a$ aid in aligning the sheet 15 with the lower edge of the board 14. On this paper are columns of indicating figures arranged also in horizontal rows. One vertical column as for instance at C is used on finished paper for representing the center of the road. The spaces between the ruled lines represent five feet and the other numbers of the sheet are used for indicating the number of feet laterally from the center line. Over the sheet 15 is placed a transparent sheet 17 of cross section paper ruled into squares, each of which represents five feet and which are drawn to the same scale as the graphic matter on the sheet 15.

When the highway is to be, for example, 66 feet wide, the sheet 15 is provided with vertical lines 18 at an appropriate distance from the column C for representing the edge of the highway. The surveyor then takes my device comprising a T square D having a shank 19 and head 20. The head 20 is placed against the edge of the drawing board 14 and the shank laid on the transparent sheet 17. Mounted on the shank 19 is a ruler 21, arranged along one side of the shank with its under surface flush with the under surface of the shank and made preferably of transparent material such as celluloid. A thin board or the like 22 is fastened to the upper surface of the ruler 21 and overlies the upper flat surface of the T square 19 as shown in Figures 1 and 2. Projecting laterally from the edge of the board 22 and opposite the ruler 21 are pins 23. A cross bar 24 is fixed to the outer end of said pins. A slidable bar 25 is mounted on the pins adjacent to the board 22 and overlapping the edge of the T square 19. Springs 26 are mounted on the pins 23 between the bars 24 and 25 for yieldingly pressing against the bar 25 and gripping the T square shank 19 between such bar 25 and the ruler 21. The bar 25 projects upwardly a little above the board 22 so that the bars 24 and 25 may be pressed together for contracting the springs and releasing the grip of the ruler holding mechanism on the T square.

It will thus be seen that the ruler holding device may be quickly and easily removed from the T square or may be easily adjusted longitudinally thereon. The ruler is graduated from its center as at 27 toward its opposite ends to correspond to the squares on the sheet 17. The ruler is adjusted until the center 27 is on a line on the cross section paper 17 which is assumed to be the instrument height. Assume that the surveyor is going to plot the elevation on station No. 4 for which readings appear on Figure 4. Then some horizontal line is taken as 1180 and this is written down as at E. Then at the left hand of column C the graph of the elevation is started below the line 1180 as represented by E at the distance corresponding to the reading 4.5 (see F Fig. 1).

It will be noted that in the reading at the fourth station, the next reading at the left of the center was at 9 feet from the center and was 4.7 on the rod. The surveyor moves the T square and ruler to the left until the edge of the T square has been moved nearly across two of the squares on the sheet 17 (representing a distance of 9 feet) and the point G is marked at 4.7 below the center mark 27 of the ruler 21. A line is then drawn between the points F and G. The rest of the elevation to the left of the center of the rod is then plotted in a similar manner. The ruler is moved to the right of the point F for the first reading to the right of the center which is 5.5, thirteen feet from the center of the proposed highway. The surveyor then marks the point H and connects the point F and H by a line. This process is continued and the cross sections for the reading at the fourth station are completed. Other elevations for the various stations are graphed in the same way.

All readings below the elevation line of the instrument are plotted according to the graduations on the ruler below the center thereof or on the minus side of the zero, while readings above the elevation are plotted above the center of the ruler or on the plus side of the zero.

By the use of the device with the method described a number of important advantages are attained, particularly in the saving of time. There are fewer operations than with other methods heretofore employed which, of course, reduces the likelihood of error. No reduction of notes is required except for the center line and level computations.

It provides a quick means for locating distances out from the central line. Plus and minus rod readings may be easily plotted. A change in instrument height on one section or for a new section requires only the resetting of the slide.

I claim as my invention:

1. The combination of a flat support having a straight edge with a sheet having parallel rulings and arranged symmetrically on the support with the rulings perpendicular to the straight edge, the rulings being supplied with designating numbers, having a transparent sheet symmetrically arranged on the first sheet and ruled in squares a T square having its head resting against the straight edge and movable therealong, and a ruler longitudinally adjustable on the shank and graduated from a medial zero in both directions.

2. A surveyor's device for use on a T square having a head and shank, said device comprising a ruler arranged along one edge of the shank having its under surface flush with the under surface of the shank and means for mounting said ruler on the shank for longitudinal adjustment, said means comprising a flat member extending across the shank of the T square, guides extending from said member, a bar slidably mounted on said guides to engage the other edge of the shank and spring means for causing such engagement to be yielding.

3. A surveyor's device comprising a T square having a head and shank, a ruler arranged along one edge of the shank having its under surface flush with the under surface of the shank and means for mounting said ruler on the shank for longitudinal adjustment, said means comprising a member secured to said ruler and extending across the shank of the T square, guides extending from said member, a bar slidably mounted on said guides and adapted to engage one edge of the shank, a second bar secured to said guides and springs on said guides between said bars, the ruler being graduated from zero in both directions.

4. The combination of a support with a vertical ruled sheet arranged thereon and having parallel rulings arranged vertically, said sheet having a central zero column and columns on opposite sides thereof supplied with designating characters, a transparent sheet symmetrically arranged on the first sheet and ruled in squares corresponding to said columns, a vertical straight edge guidingly arranged for horizontal movement on said transparent sheet and a ruler longitudinally adjustable on said guide and graduated from a medial zero in both directions.

5. The combination of a flat support with a vertical ruled sheet arranged thereon having columns thereon supplied with designating numbers, a transparent sheet arranged on the first sheet, a straight edge guidingly arranged on said transparent sheet for movement across said sheet and a ruler having a member secured thereto and extending across the shank of the T-square, guides extending from said member, a bar slidably mounted on said guides to engage the other edge of the shank and spring means causing such engagement to be yielding whereby said ruler is longitudinally adjustable on said guide.

Des Moines, Iowa, July 31, 1926.

ROBERT McCORMICK.